US008911211B2

(12) United States Patent
Castell Martínez et al.

(10) Patent No.: US 8,911,211 B2
(45) Date of Patent: *Dec. 16, 2014

(54) WIND TURBINE

(75) Inventors: Daniel Castell Martínez, Barcelona (ES); Carlos Casanovas Bermejo, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 500 days.

This patent is subject to a terminal disclaimer.

(21) Appl. No.: 13/387,480

(22) PCT Filed: Jan. 19, 2011

(86) PCT No.: PCT/EP2011/050706
§ 371 (c)(1),
(2), (4) Date: Jan. 27, 2012

(87) PCT Pub. No.: WO2011/120721
PCT Pub. Date: Oct. 6, 2011

(65) Prior Publication Data
US 2013/0022468 A1    Jan. 24, 2013

(30) Foreign Application Priority Data

Mar. 29, 2010 (EP) .................................... 10158263

(51) Int. Cl.
F03D 11/02 (2006.01)
(52) U.S. Cl.
CPC ........... *F03D 11/02* (2013.01); *F05B 2230/606* (2013.01); *F05B 2240/60* (2013.01); *F05B 2260/403* (2013.01); *Y02E 10/722* (2013.01)
USPC ................. 416/204 R; 416/244 R; 415/124.2
(58) Field of Classification Search
CPC ........................... F03D 1/0691; F05B 2240/61

USPC ........... 415/124.2; 416/204 R, 170 R, 224 R; 464/69, 73, 74, 81, 82
See application file for complete search history.

(56) References Cited

U.S. PATENT DOCUMENTS

| 4,757,211 | A   |   | 7/1988  | Kristensen |
|-----------|-----|---|---------|-----------|
| 6,483,199 | B2  | * | 11/2002 | Umemoto et al. .............. 290/55 |
| 8,004,107 | B2  | * | 8/2011  | Stiesdal ......................... 290/55 |
| 8,662,850 | B2  | * | 3/2014  | Castell Martinez et al. .. 416/204 R |
| 2006/0153675 | A1 |   | 7/2006  | Rogall |

FOREIGN PATENT DOCUMENTS

| DE | 29522190 | 1/2001 |
|----|----------|--------|
| EP | 0937902  | 9/2004 |
| ES | 2163362  | 1/2002 |
| GB | 1190977  | 5/1970 |

OTHER PUBLICATIONS

Stiesdal, Henrik "The Wind Turbine, Components and Operation," Bonus Info, Autumn 1999, 4-24, Bonus Energy A/S, Brande, Denmark.

* cited by examiner

*Primary Examiner* — Ninh H Nguyen
(74) *Attorney, Agent, or Firm* — Squire Patton Boggs (US) LLP

(57) ABSTRACT

A wind turbine is described. The turbine includes a hub with one or more blades that rotatably mounted on a frame and operatively coupled to a shaft. The shaft is provided at least partially internally to the frame, and a center piece from which a plurality of spokes extends substantially radially is mounted on the shaft. The hub is provided with a plurality of circumferentially arranged axial protrusions. Flexible elements are arranged to connect the spokes to the protrusions.

20 Claims, 6 Drawing Sheets

WIND TURBINE

CROSS-REFERENCE TO RELATED APPLICATIONS

This application claims priority to PCT Application No. PCT/EP2011/050706 entitled "Wind Turbine", filed Jan. 19, 2011 which claims priority to European Patent Application No. 10158263.3 entitled "Wind Turbine" filed Mar. 29, 2010, the disclosures of each of which are hereby incorporated herein in their entirety by reference.

BACKGROUND

Embodiments of the invention relates to a wind turbine. Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

Gearboxes form one of the most maintenance-intensive components of the wind turbine. They need to be inspected regularly and do not always fulfil their expected service life; the gearbox or some of its parts sometimes need to be replaced prematurely. This is due to the high loads and fluctuating loads to which a gearbox is subjected. Particularly, the bending loads on the blades, which may be transmitted through the rotor shaft to the gearbox are damaging.

The cause of the transmission of the bending loads and deformations from the blades and hub to the generator lies in the wind turbine configuration. In most conventional wind turbines, the rotor hub is mounted on one end of the rotor shaft. The rotor shaft is rotatably mounted in a support structure within the nacelle on top of the wind turbine tower. The rotor thus forms an overhanging structure that transmits torque, but additionally transmits cyclical bending loads due to the loads on the blades and the weight of the hub and blades. These bending loads are transmitted either to the generator (in the case of direct drive turbines) causing air gap variations or to the gearbox causing fluctuating loads in the gearbox.

In order to solve this problem, it is known from e.g. ES 2 163 362 to provide a wind turbine tower with a forward extending frame. The rotor hub with its plurality of blades is mounted and can rotate upon the frame; the rotor hub is coupled to a rotor shaft located within the frame. Such a wind turbine has been schematically indicated in FIG. 1. In FIG. 1, a wind turbine 100 comprises a hub 110, which is rotatably mounted upon frame 170, at a distal end of the frame. Frame 170 is mounted upon tower 180. A coupling element 120 couples rotor shaft 130 to hub 110. The rotation of rotor shaft 130 is transformed with a gearbox 140 to a fast rotation of output shaft 150 which drives generator 160.

In a prior art coupling, a center piece is mounted on a rotor shaft with a shrink disc. Along the circumference of the annular rim of the center piece a plurality of holes is provided. Bolts provided in elastic bushings are used to connect the center piece to the hub. The elastic bushings make the coupling more flexible in the longitudinal direction of the rotor shaft.

With this kind of configuration comprising a hub mounted on a frame, the loads due to the weight of hub and blades are transmitted more directly via the frame to the tower, whereas the rotor shaft transmits mainly torque to the gearbox (and/or generator), thus avoiding to a certain extent the undesired loads and deformations in the drive train. This represents an improvement with respect to other prior art wind turbines, but the transmission of bending loads from the blades to the rotor shaft, (and through the rotor shaft to the gearbox) cannot be avoided entirely.

Furthermore, mounting the coupling with the plurality of bolts is a cumbersome, and time consuming and therefore expensive task. Disassembling the coupling for maintenance, inspection or repair is of course just as cumbersome. It is furthermore important in this configuration that the rotor shaft be perfectly aligned because a misalignment leads to stresses in the rotor shaft, the coupling and the hub. These stresses may lead to e.g. fatigue problems. The installation process is thus further complicated because of the need to perfectly align the rotor shaft with respect to the hub.

Also, having such a quantity of bolts and flexible elements (e.g. approximately 30 each per wind turbine) significantly raises the part count, which may complicate logistics.

There thus still exists a need for a wind turbine in which the transmission of bending loads from the blades to the rotor shaft is further reduced. There also exists a need for a wind turbine with a reduced part count and which is easier to install and maintain.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

It is an objective of the invention to provide a wind turbine which at least partially fulfils the aforementioned needs.

In a first aspect, the invention provides a wind turbine comprising a hub with one or more blades, the hub being rotatably mounted on a frame and operatively coupled to a shaft, wherein the shaft is provided at least partially internally of the frame, and a center piece from which a plurality of spokes extend substantially radially is mounted on the shaft, and the hub is provided with a plurality of circumferentially arranged axial protrusions, and flexible elements are arranged to connect the spokes to the protrusions.

In this aspect of the invention, the stiffness of the coupling between the hub and the shaft with respect to loads other than torque may be reduced significantly as compared to prior art systems. This means that torque from the hub is effectively transmitted to the shaft, but that the transmission of all other loads is substantially reduced. Also, the part count may be significantly reduced and the mounting of the connection between the hub and rotor shaft is made much easier. A further aspect of this configuration is that there is no further need to perfectly align the rotor shaft with respect to the hub. The possible misalignment due to the manufacturing tolerances can be absorbed by the flexible elements.

In this sense, "flexible" elements are to be understood to be elements that deform or yield ("give in") relatively easily to loads in at least one direction. They may be made from any suitable material, e.g. elastomer materials, or combinations of metals with elastomers or yet other suitable materials. The elements may obtain their flexible properties due to their shape, material, positioning, mounting or combinations of these.

In some embodiments, the flexible elements are preloaded: the elements are compressed between the protrusions and spokes, so that they cannot go loose during operation of the wind turbine.

In some embodiments of the invention, each of the protrusions is connected (through the flexible elements) to a pair of the spokes. Each of the hub's protrusions is thus located between a pair of spokes. In one embodiment, the hub comprises three protrusions and the center piece comprises three pairs of spokes. In other embodiments, a different number of protrusions and pairs of spokes may be used, e.g. two, four, five or six. Configurations having three or more protrusions and pairs of spokes have advantages of more balanced dynamic loading.

In some embodiments of the invention, the center piece further comprises annular segments between neighboring pairs of spokes. In preferred embodiments the annular segments comprise at least one hole. These holes may provide access to the hub or the hub's bearings. They thereby facilitate maintenance and inspection.

In further embodiments, each of the spokes is connected to a pair of the protrusions. In yet other embodiments, the wind turbine comprises the same number of spokes and protrusions. It will be clear that the number of spokes and protrusions may be freely varied also in these embodiments.

Optionally, the center piece is mounted on the shaft with a shrink disc. In other embodiments, the center piece may be connected to the shaft in a different way: e.g. a bolted connection, welding, brazing, using adhesive, through a process of thermal interference, or a form fit using e.g. serrations provided on the shaft, combinations of the above, or yet other methods. The choice for a suitable connection method may depend e.g. on the possible need for the coupling to be disassembled.

In some embodiments of the invention, the rotor shaft may be a substantially tubular hollow shaft. Due to the reduced loads on the shaft, the shaft may be tubular, instead of a conventional solid shaft. In other embodiments of the invention however, a conventional solid shaft may be used.

In some embodiments of the invention, the stiffness of the flexible elements can be adapted. In this aspect, the stiffness of the elements can be adjusted (e.g. during maintenance) in accordance with circumstances.

In some embodiments of the invention, the stiffness of at least one of the flexible elements is different from the stiffness of at least another of the flexible elements.

In some embodiments of the invention, the flexible elements are elastic. In other embodiments of the invention, the flexible elements are visco-elastic. The flexible elements may be elastic in the sense that their deformation is proportional to the applied load. They may also be visco-elastic in the sense that they exhibit time-dependent strain. Depending on the vibrations that generally occur in the wind turbine, application of elastic, visco-elastic or yet other elements may be beneficial.

In some embodiments, the flexible elements may each comprise a hydraulic chamber. Preferably in these embodiments, the elements comprising a hydraulic chamber are connected by one or more hydraulic circuits. In preferred embodiments, the flexible elements that are compressed by the wind turbine rotor torque may be connected to a common hydraulic circuit, such that radial loads are equally divided between the various struts and protrusions. Similarly, the flexible elements that are being decompressed by the wind turbine rotor torque may also be connected to another common hydraulic circuit. This kind of configuration allows the reduction of radial loads transmitted from the hub to the generator rotor which may be caused e.g. by radial misalignment of the axes of the generator rotor and wind turbine rotor.

In some implementations, the hydraulic circuits of the flexible elements may be actively controlled to influence e.g. the torsional eigenfrequency of the drive train or to counteract vibrations using active damping or reduce load peaks by releasing hydraulic fluid from such circuits.

In another aspect, the invention provides a method of assembling a wind turbine substantially as hereinbefore described, comprising: mounting the hub on the frame, providing the rotor shaft in the frame, mounting the center piece on the rotor shaft, positioning a first flexible element between a first protrusion and a first spoke, applying pressure to compress the first flexible element, and positioning a second flexible element between the first protrusion and a second spoke or between a second protrusion and the first spoke.

DESCRIPTION OF THE DRAWINGS

Particular embodiments of the invention will be described in the following, only by way of non-limiting examples, with reference to the appended drawings, in which.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Figure 1:
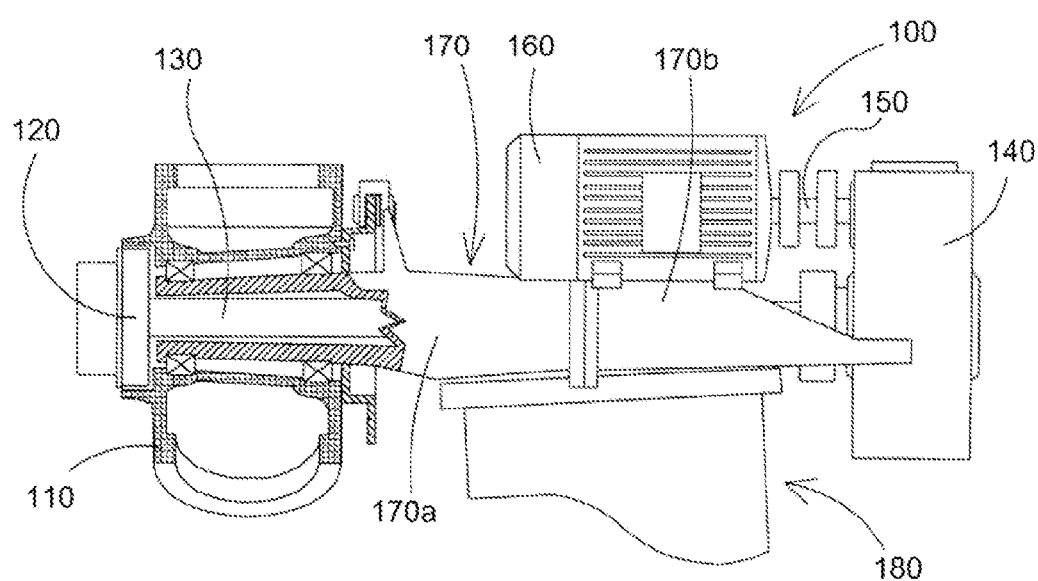
FIG. 1 illustrates a prior art wind turbine.
Figure 2:
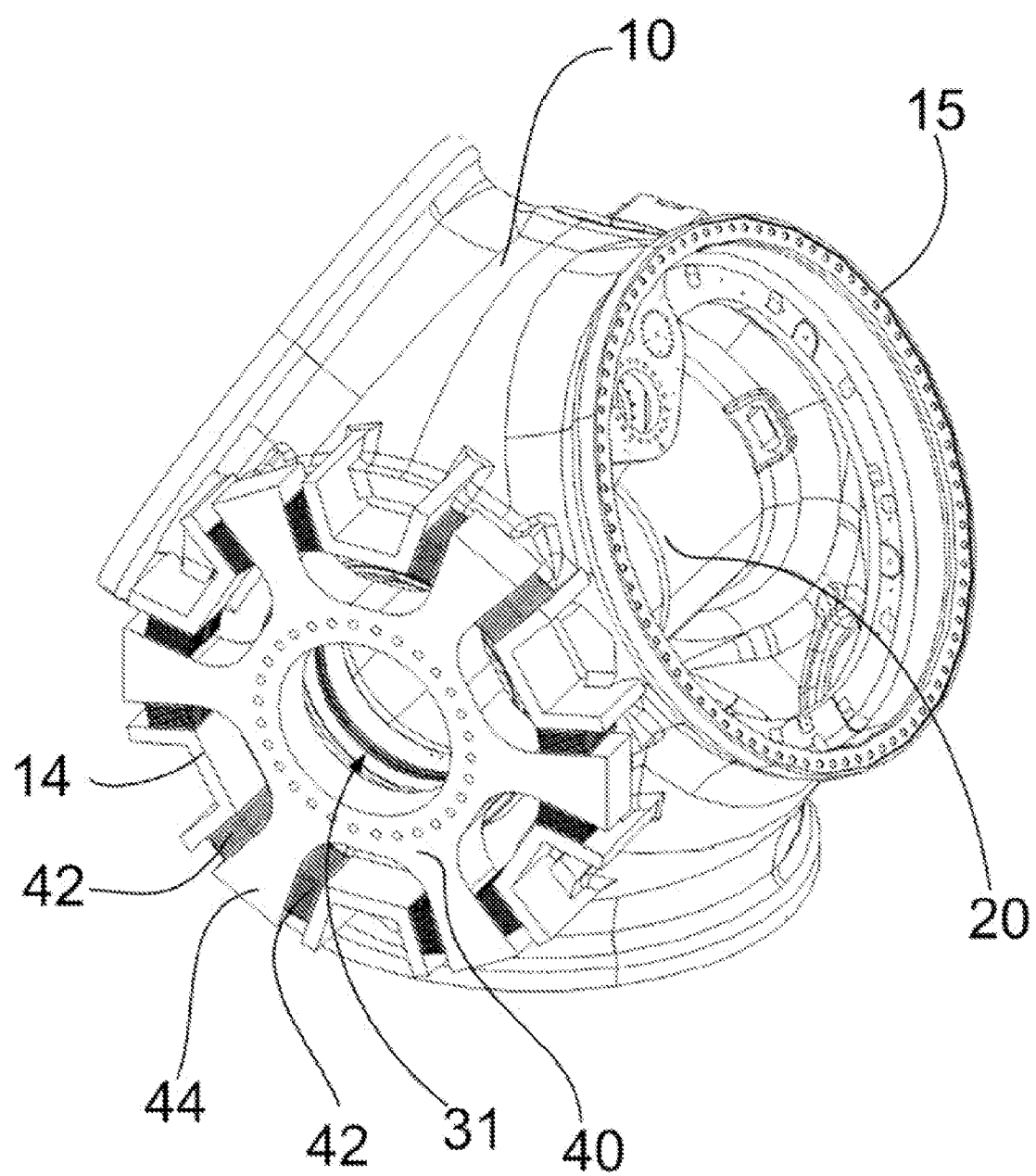
FIG. 2 schematically illustrates a first embodiment of wind turbine.

With reference to the drawings, FIG. 2 schematically illustrates a first embodiment of wind turbine. Hub 10 is rotatably mounted on frame 20. The hub carries a plurality of blades (not shown) which may be mounted in blade root fitting 15. The hub comprises a number of protrusions 14. In the particular embodiment shown in FIG. 2, six protrusions were provided, but within the scope of the invention, this number may be freely varied.

A rotor shaft (not shown) may be provided in the central opening 31 of center piece 40. Center piece 40 may thus be mounted on the rotor shaft through e.g. welding, a bolted connection, an interference fit or in yet other ways. In this embodiment, six radially extending spokes 44 are provided on center piece 40, and twelve flexible elements 42 connect the spokes 44 to the protrusions 14.

Figure 3:
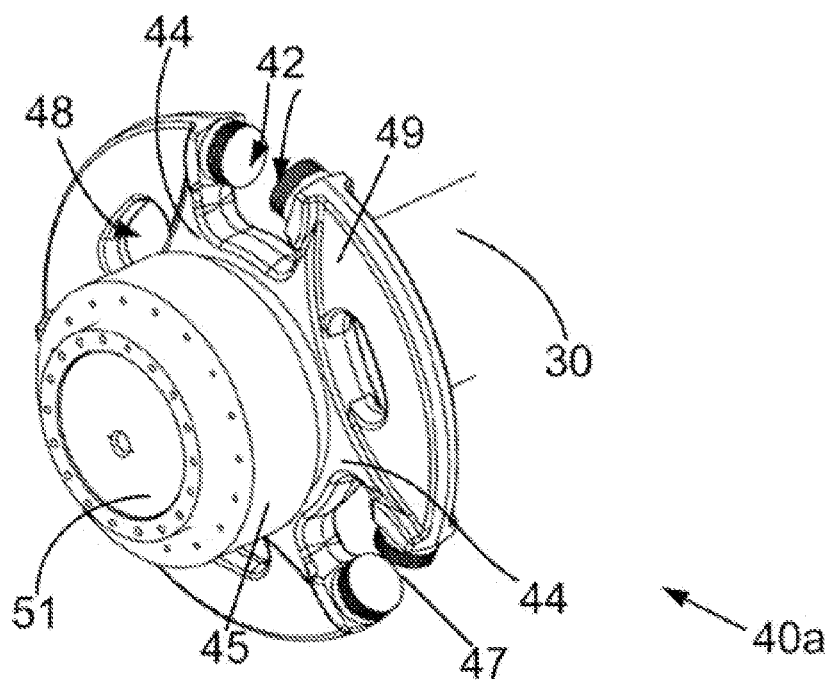
FIG. 3 schematically illustrates another embodiment of a coupling between the hub and rotor shaft.

FIG. 3 illustrates an alternative coupling of the rotor shaft to the hub in accordance with embodiments of the invention. A center piece 40a is mounted on rotor shaft 30 through a shrink disc 45. The shrink disc 45 is provided around a tubular extension of the center piece (not visible in FIG. 3) and is mounted so as to compress the tubular extension and thereby establish a secure fit. Six substantially radially extending spokes 44 are provided on the center piece. These spokes are provided in pairs. Openings 47 are created between the distal ends of the pairs of spokes 44. Suitable protrusions on the hub (not shown in this figure) can be fitted in these openings. Flexible elements 42 are provided to connect the spokes 44 to these protrusions from the hub. In this embodiment, annular segments 49 connect pairs of spokes 44 to each other. These annular segments 49 may serve to evenly distribute the loads. Access holes 48 have been provided which facilitate inspection and maintenance of the hub and components provided within the hub. Reference sign 51 indicates a closing element which substantially closes off the shaft and may protect its inside from the environment.

Figure 4:
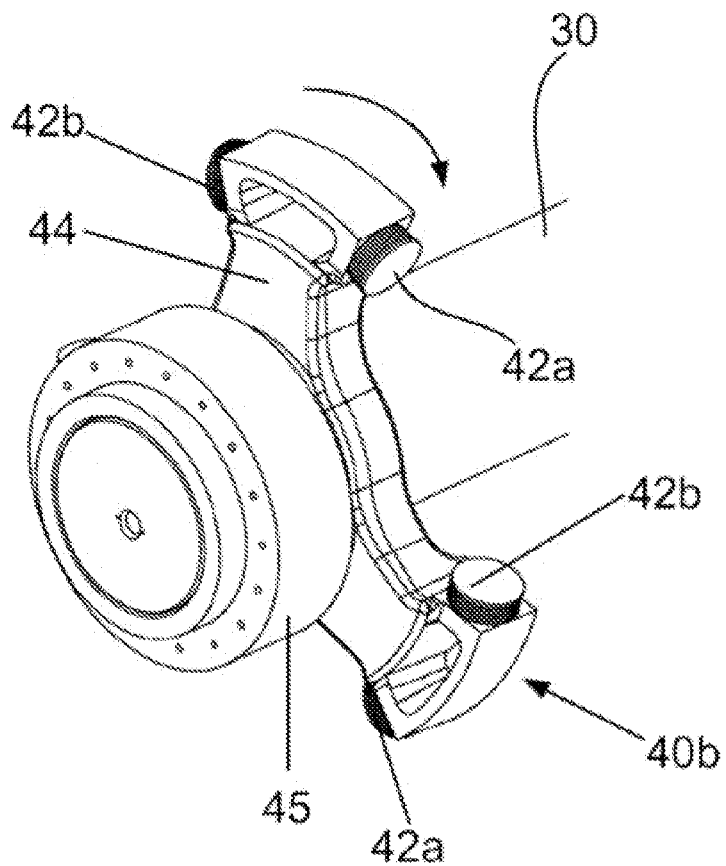
FIG. 4 schematically illustrates a further embodiment of a coupling between the hub and rotor shaft.

FIG. 4 illustrates yet another coupling of the rotor shaft to the hub in accordance with the present invention. A center piece 40b is mounted on rotor shaft 30 using a shrink disc 45. Radially extending spokes 44 can be fitted between pairs of protrusions on the hub (not shown in this figure). Flexible elements 42 connect the three spokes 44 to the pairs of protrusions on the hub.

Figure 5:
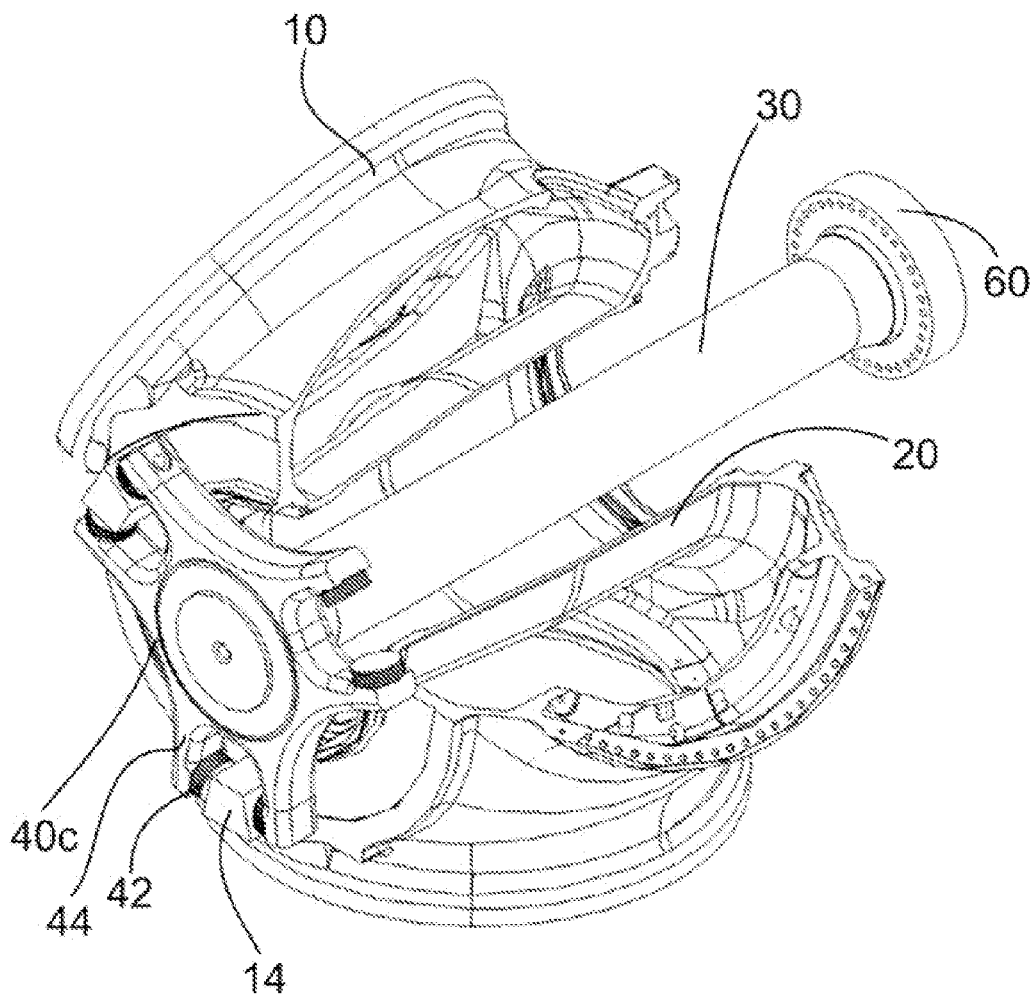
FIG. 5 schematically illustrates yet another embodiment of a wind turbine.

FIG. 5 illustrates yet a further embodiment of a wind turbine. A hub 10 is connected to a rotor shaft 30. The rotor shaft 30 is connected to a first stage of a gearbox. Reference sign 60 is used to indicate this connection. Similarly to the embodiment of FIG. 3, center piece 40c carries three pairs of spokes 44. Each pair of spokes defines a space in between them. Each protrusion 14 on the hub is connected to such a pair of spokes using flexible elements 42. A notable difference with the embodiment of FIG. 3 is that the center piece 40c does not comprise annular segments connecting the spokes.

In the embodiment of FIG. 5, the center piece 40c is welded on the shaft 30. For installations and repair, it is important that at least one of the connection of the shaft with a gearbox stage or the connection of the shaft with the center piece is removable. In the shown embodiment for example, the shaft comprises a flange which is bolted to the first stage of the gearbox.

In some embodiments, the flexible elements depicted in FIGS. 2-5 may each comprise a hydraulic chamber. Preferably in these embodiments, the elements comprising a hydraulic chamber are connected by one or more hydraulic circuits. This kind of configuration allows the reduction of radial loads transmitted from the hub to the generator rotor which may be caused e.g. by radial misalignment of the axes of the generator rotor and wind turbine rotor.

In embodiments, the flexible elements that are compressed by the wind turbine rotor torque may be connected to a common hydraulic circuit, such that radial loads are equally divided between the various spokes. Similarly, the flexible elements that are being decompressed by the wind turbine rotor torque may also be connected to another common hydraulic circuit.

Figure 6A:
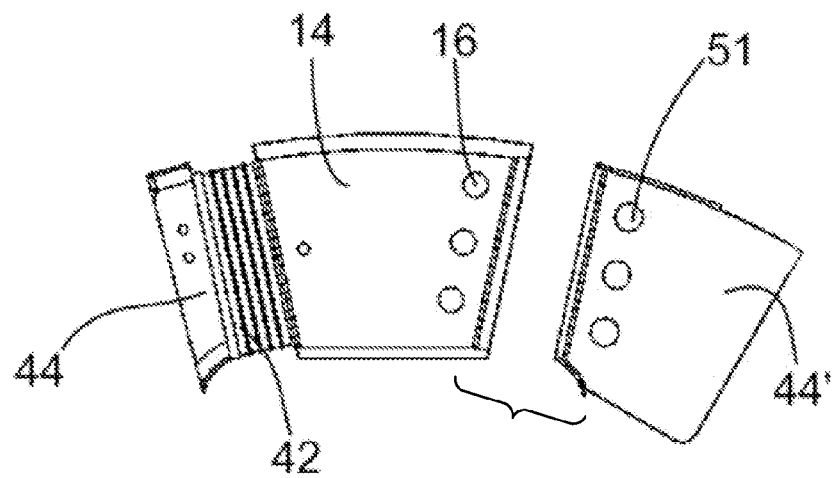
FIGS. 6a-6d illustrate a method of mounting flexible elements in a coupling.

FIGS. 6a-6d illustrate a method of mounting flexible elements in a coupling in accordance with an embodiment of the invention. FIG. 6a illustrates a first step of such a method. One flexible element 42 is positioned between a first protrusion 14 and a distal end of a first spoke 44. Furthermore illustrated in FIG. 6a are assembly holes 16 on protrusion 14 which serve to mount a first assembly tool. Similarly, a second spoke 44' comprises such assembly holes 51.

Figure 6B:
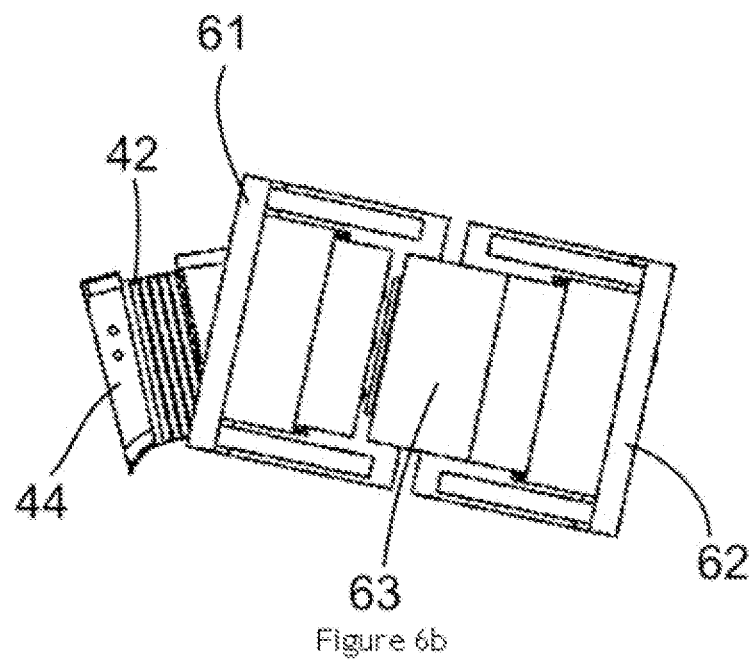

FIG. 6b illustrates a following step in the mounting process: first assembly support 61 and second assembly support 62 are screwed on the first rotor hub protrusion 14 and second spoke 44' respectively using the assembly holes. A (hydraulic) piston 63 is provided between these assembly supports.

Figure 6C:
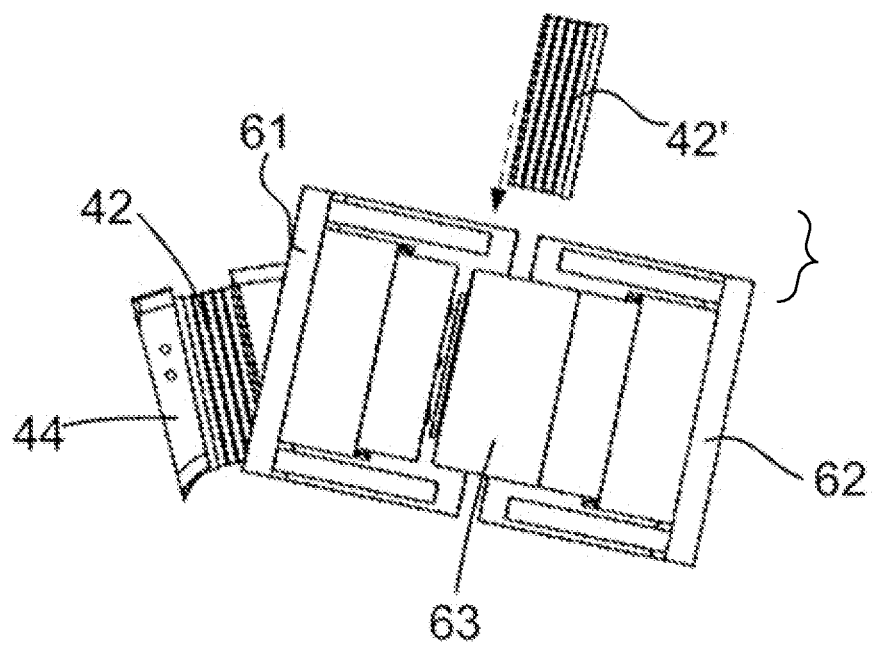

By subsequently actuating the piston 63, FIG. 6c, the assembly supports 61 and 62 may be pushed apart and the first flexible element 42 is compressed. The first rotor hub protrusion 14 and the second spoke 44' are hereby also pushed apart. This process creates sufficient space to fit a second flexible element 42' on the other side of the protrusion 14 (behind the assembly supports), as indicated with an arrow in FIG. 6c.

Figure 6D:
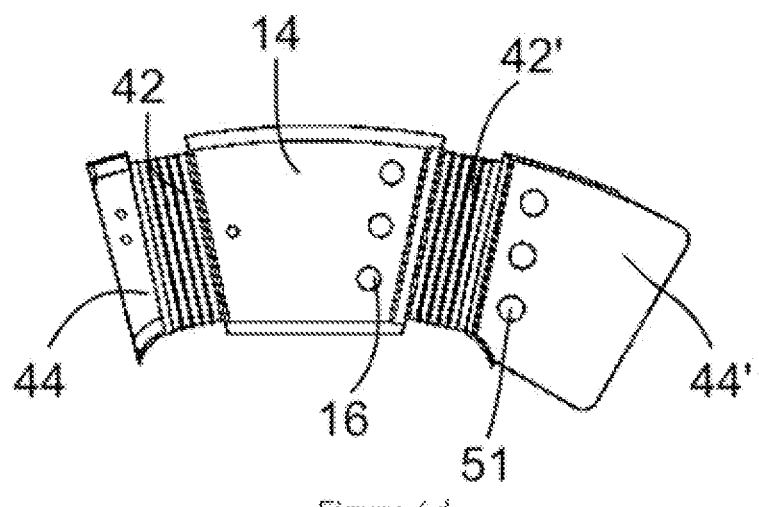

The piston may subsequently be released. The piston 63 and the assembly supports 61 and 62 may then be removed. As a result of this process, flexible elements 42 and 42' are pre-loaded between the protrusions on the hub 14 and the spokes 44, 44' of the center piece (FIG. 6d).

The described mounting process may be carried out, one-by-one or may be carried out for several flexible elements at the same time: a first set of flexible elements is then mounted, multiple assembly supports are mounted and multiple pistons are subsequently actuated to compress the first set of flexible elements.

The method of mounting the flexible elements as illustrated in FIGS. 6a-6d, was shown for a configuration comprising a plurality of protrusions on the hub, each protrusion being located between a pair of spokes (a similar configuration as shown in e.g. FIG. 3). It will be clear however that a similar method may be used when mounting the flexible elements in other embodiments of the invention, such as e.g. the embodiments shown in FIG. 2 (equal number of spokes and protrusions) and FIG. 4 (each spoke positioned between a pair of protrusions).

It will furthermore be clear that the protrusions on the hub, the spokes on the center piece and the flexible elements may take many other suitable shapes than the ones shown in the figures. The cross-section of the flexible elements may e.g. be circular, rectangular, square or other. The protrusions on the hub may e.g. be substantially thin-walled as shown in FIG. 2, or more solid as shown in FIG. 5.

The invention is moreover not limited in any way to the kind of bearings used to mount the hub on the frame or to mount the generator on the frame. Suitable fluid bearings, particularly hydrodynamic or hydrostatic bearings, may be employed. Alternatively, suitable rolling element bearings, such as roller bearings, double-tapered roller bearings, or ball bearings may also be used. The bearings may further be purely radial bearings or radial and axial bearings.

The invention is furthermore not limited to the use of a gearbox in the wind turbine. The same coupling of the hub to the shaft may be used e.g. in a direct drive configuration.

Although this invention has been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular disclosed embodiments described before, but should be determined only by a fair reading of the claims that follow.

We claim:
1. A wind turbine comprising:
  a frame;
  a hub with one or more blades, the hub being rotatably mounted on the frame and having a plurality of circumferentially arranged axial protrusions;
  a shaft operatively coupled to the hub and being disposed at least partially internally to the frame;
  a center piece mounted on the shaft and having a plurality of spokes extending substantially radially; and flexible elements arranged to connect the spokes to the protrusions.

2. The wind turbine according claim 1, wherein each of the protrusions is connected to a pair of the spokes.

3. The wind turbine according to claim 2, wherein the hub includes three of the protrusions and the center piece includes three pairs of the spokes.

4. The wind turbine according to claim 1, wherein the center piece further comprises annular segments between neighboring pairs of spokes.

5. The wind turbine according to claim 4, wherein the annular segments comprise at least one hole.

6. The wind turbine according to claim 1, wherein each of the spokes is connected to a pair of the protrusions.

7. The wind turbine according to claim 6, wherein the center piece includes three of the spokes and the hub includes three pairs of the protrusions.

8. The wind turbine according to claim 1, wherein the number of the spokes and the protrusions is equal.

9. The wind turbine according to claim 1, wherein the center piece is mounted on the shaft with a shrink disc.

10. The wind turbine according to claim 1, wherein the shaft is a substantially tubular hollow shaft.

11. The wind turbine according to claim 1, wherein the stiffness of the flexible elements can be adapted.

12. The wind turbine according to claim 1, wherein the stiffness of at least one of the flexible elements is different from the stiffness of at least another of the flexible elements.

13. The wind turbine according to claim 1, wherein the flexible elements are elastic.

14. The wind turbine according to claim 1, wherein the flexible elements are visco-elastic.

15. The wind turbine according to claim 1, wherein the flexible elements are pre-loaded.

16. The wind turbine according to claim 1, wherein the flexible elements comprise a hydraulic chamber.

17. The wind turbine according to claim 16, wherein the flexible elements are connected by one or more hydraulic circuits.

18. The wind turbine according to claim 1, wherein one or both of the protrusions and the spokes include assembly holes adapted for mounting tools used in the assembly of the flexible elements.

19. A method of assembling a wind turbine that includes a frame, a hub with one or more blades and, plurality of circumferentially arranged axial protrusions, a rotor shaft, a center piece having a plurality of spokes extending substantially radially, and flexible elements arranged to connect the spokes to the protrusions, the method comprising:
 mounting the hub on the frame;
 disposing the rotor shaft at least partially internally in the frame;
 mounting the center piece on the rotor shaft;
 positioning a first flexible element between a first protrusion and a first spoke;
 applying pressure to compress the first flexible element; and
 positioning a second flexible element between the first protrusion and a second spoke or between a second protrusion and the first spoke.

20. The method of assembling according to claim 19, wherein applying pressure to compress the first flexible element further comprises:
 mounting a first assembly support on the first protrusion or on the first spoke;
 mounting a second assembly support on the second spoke or on the second protrusion; and
 actuating a hydraulic piston positioned between the first and second assembly supports to separate them.

* * * * *